US008736098B2

(12) United States Patent
Choi et al.

(10) Patent No.: US 8,736,098 B2
(45) Date of Patent: May 27, 2014

(54) SYMMETRICAL DUAL-STRUCTURED WIND POWER GENERATION SYSTEM

(76) Inventors: Hae-Yong Choi, Seoul (KR); Jin-Hyun Choi, Seoul (KR)

( * ) Notice: Subject to any disclaimer, the term of this patent is extended or adjusted under 35 U.S.C. 154(b) by 362 days.

(21) Appl. No.: 12/975,892

(22) Filed: Dec. 22, 2010

(65) Prior Publication Data

US 2011/0156403 A1      Jun. 30, 2011

(30) Foreign Application Priority Data

Dec. 30, 2009   (KR) ................. 10-2009-0134226

(51) Int. Cl.
*F03D 1/04*   (2006.01)
(52) U.S. Cl.
USPC ............................................. 290/55
(58) Field of Classification Search
USPC ............................................. 290/55
See application file for complete search history.

(56) References Cited

U.S. PATENT DOCUMENTS

| | | | | |
|---|---|---|---|---|
| 1,345,022 A | * | 6/1920 | Oliver | 415/4.3 |
| 3,339,078 A | * | 8/1967 | Crompton | 290/44 |
| 4,424,452 A | * | 1/1984 | Francis | 290/55 |
| 7,368,828 B1 | * | 5/2008 | Calhoon | 290/55 |
| 7,484,363 B2 | * | 2/2009 | Reidy et al. | 60/398 |
| 7,804,186 B2 | * | 9/2010 | Freda | 290/55 |
| 8,358,023 B2 | * | 1/2013 | West | 290/43 |
| 2001/0004439 A1 | * | 6/2001 | Bolcich et al. | 416/9 |
| 2004/0183310 A1 | * | 9/2004 | Mowll | 290/55 |
| 2010/0187828 A1 | * | 7/2010 | Reidy et al. | 290/55 |
| 2010/0207389 A1 | * | 8/2010 | Nyffenegger | 290/44 |
| 2010/0310361 A1 | * | 12/2010 | Carre | 415/199.5 |
| 2010/0320771 A1 | * | 12/2010 | Urch | 290/55 |
| 2011/0285139 A1 | * | 11/2011 | Falbo | 290/55 |
| 2012/0013129 A1 | * | 1/2012 | Cornelius et al. | 290/54 |

FOREIGN PATENT DOCUMENTS

| | | | |
|---|---|---|---|
| CN | 1807876 A | * | 7/2006 |
| DE | 29617306 U1 | * | 12/1996 |
| DE | 102010020380 | * | 11/2011 |
| FR | 2253391 A | * | 8/1975 |
| GB | 2430982 A | * | 4/2007 |

\* cited by examiner

*Primary Examiner* — Joseph Waks
(74) *Attorney, Agent, or Firm* — Bacon & Thomas, PLLC (57) ABSTRACT

A wind power generation system using the Bernoulli principle having an elongated tube, wind entry and exit openings on opposite ends of a main body of the tube, a central wind passing section of the tube having a smaller diameter than that of the wind entry and exit openings between the opposite ends, support struts spanning the wind entry and exit openings, and left and right power generators arranged centrally of the support struts, with the generators being rotated simultaneously on a single rotation shaft axle. Plural wind turbines are provided left-right symmetrically on the rotation shaft axle, and transverse rotation bearings are provided on the lower and upper part of the wind passing tube, so the tube can pivot into the wind via vanes.

8 Claims, 10 Drawing Sheets

SYMMETRICAL DUAL-STRUCTURED WIND POWER GENERATION SYSTEM

BACKGROUND OF THE INVENTION

1. Field of the Invention

Embodiments of the invention relate to a symmetrical dual-structured wind power generation system, and more particularly, to a symmetrical dual-structured wind power generation system through which wind power generation efficiency is increased doubly and further electric power is generated even in a light wind.

2. Description of the Related Art

Figure 11:
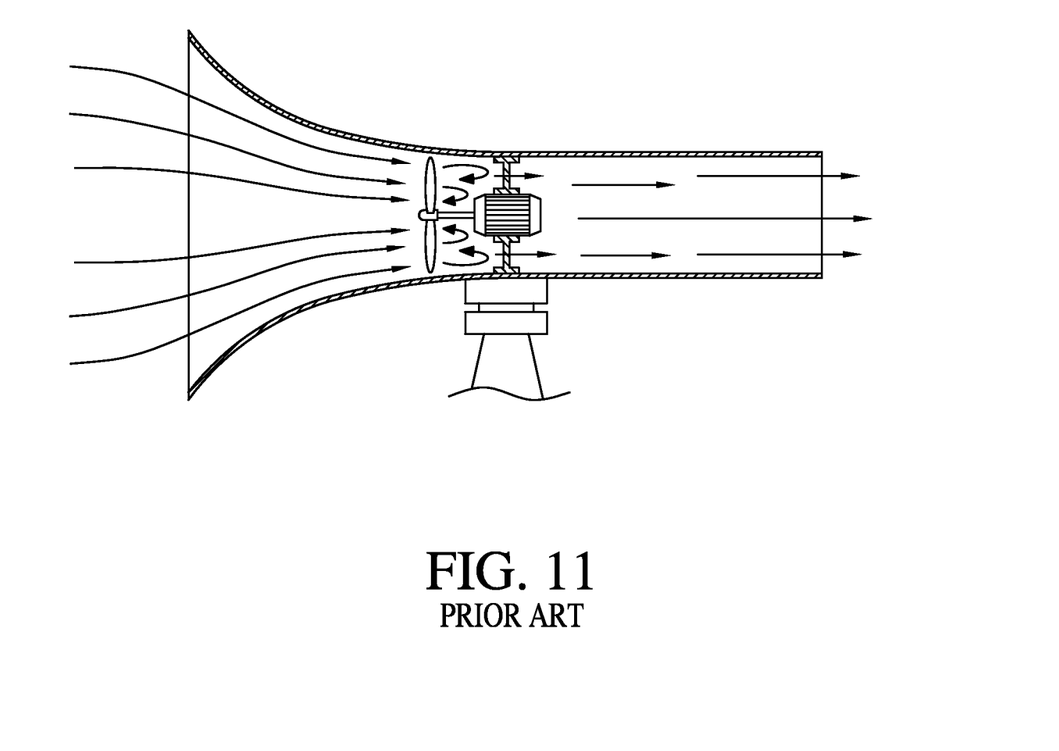
FIG. 11 shows a prior art wind power generator.

Generally, Bernoulli principle technology has been adopted for a wind power generation using wind tubes in the prior art. The configuration disclosed as a prior wind power generation system in Korean Patent Registration No. 20-0271770 comprises a rotating propeller and a generator inside a venturi tube, which is considered to be simple, and is shown in FIG. 11 of the drawings of this disclosure. Under this configuration the generator arranged inside a venturi tube interrupts wind flow but sometimes the wind becomes reversed, causing a decrease in efficiency. In particular, the prior art power generation system can be operated in a wind moving in a single direction. However, wind does not flow typically in one direction and varies in its direction, that is, wind flows from seashore to land during daytime and in an opposite direction during night time, causing wind power generation efficiency to decrease. Meanwhile, since the weight of the prior wind power generator is heavy and further a rotating part thereof which is operated depending on a wind direction is arranged on a lower support part of a power motor, rotational efficiency is decreased dramatically depending on a wind direction variation. Further, only one power generation system is placed on one support column, causing the installment cost to be high. In particular, under this configuration wind has to be strong enough for power generation and thus its use is limited to high mountains and seashores, where strong wind can be expected.

SUMMARY OF THE INVENTION

Embodiments of the invention are proposed to solve the aforementioned drawbacks of the prior art, and one object of the invention is to provide a wind power generation system which can be operated in light wind in and rotated smoothly depending on wind direction variation, improving power generation efficiency doubly, as compared with the prior art wind power generation system.

Another object of the present invention is to provide a wind power generation system where several of the generator systems can be arranged on one support column and further can be placed in various locations such as a tree in a forest, a street light in a city, a wall face of a building, such locations not being limiting to places where strong wind is expected, thereby improving wind power generation efficiency.

The wind power generation system according to the present invention includes a main body of a Bernoulli tube form, a wind entry and exit opening arranged left-right symmetrically on the main body tube, two power generators arranged in the central part of the wind entry and exit openings, respectively, wherein two power generators rotate about a common rotation shaft axle. Turbine blades or propellers are arranged on the left, right, and possibly middle part of the rotation shaft axle, and the rotation axle is thereby rotated by wind energy to generate electric power.

According to one embodiment of the present invention, a transverse rotation arrangement for the tube body is arranged doubly on the lower and upper (left or right) part of a middle area of the left and right sides of the main body and a double support rod is provided connected to the main body so the body can be rotated about a transverse axis with light wind.

Meanwhile, according to another embodiment of the invention, since the power generator is arranged in the middle part of the wind entry and exit, respectively, the kinetic energy of the wind may be used maximally. The diameters of the wind entry and exit are also made large and the central wind passing tube diameter is smaller, so that the speed of wind flowing through the wind passing tube is increased due to the Bernoulli effect, thereby improving power generation efficiency. Furthermore, the left and right generators are rotated simultaneously by the double rotation turbine blades by even a light wind. In addition, two generators are operated in a single wind power generation system, doubly increasing power generation efficiency. The lower and upper (or left and right) transverse rotation axle are provided left-right symmetrically on the middle of the central tube and thus the main body can be rotated by light wind, increasing power generation efficiency more than 50%.

According to another embodiment of the wind power generation system of the present invention, several generator systems may be arranged on one support column so that a multiple power generation system will occupy only a small space, saving cost. The system may be located anywhere wind occurs, and is not limited to a particular location.

It is to be understood that both the foregoing general description and the following detailed description are exemplary and explanatory and are intended to provide further explanation of embodiments of the invention as claimed.

DETAILED DESCRIPTION OF THE PREFERRED EMBODIMENTS

The preferred embodiments of a wind power generation system will be described in detail with reference to the accompanying drawings. However, it has to be understood that the invention is not limited to the preferred embodiments described herein.

Figure 1:
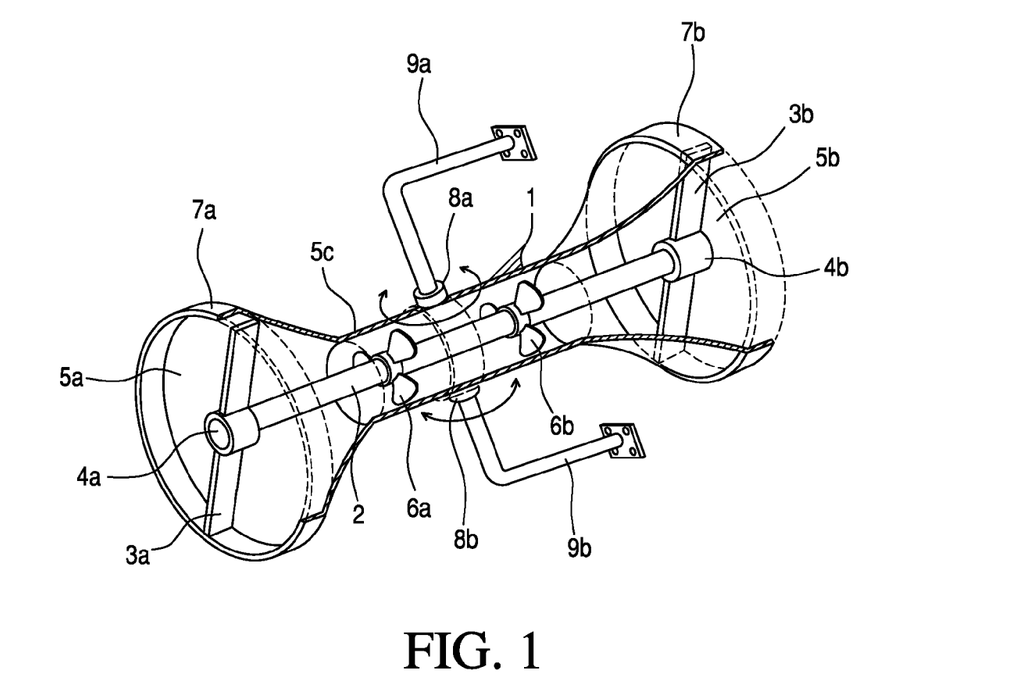
FIG. 1 shows schematically main elements of a wind power generation system according an embodiment of the invention.

FIG. 1 shows schematically the wind power generation system according to an embodiment of the invention. As shown in FIG. 1, a main body 1 of the system is left-right symmetrically formed Bernoulli tube. That is, a wind entry opening 5a is placed on left side and a wind exit 5b is placed on a right side of the main body 1, which are symmetrical as shown, and further a central wind passing tube 5c is arranged in a middle part of the main body 5. Here, the diameter of the wind passing tube may be less than a half of those of the wind entry opening 5a and the wind exit opening 5b, consistent with obtaining a Bernoulli tube effect.

As shown in FIG. 1, a left support strut 3a is provided vertically (or horizontally) in the wind entry opening 5a of the left side of the main body 1 and further a left electric generator 4a is connected to the left support shaft axle 2 supported centrally by strut 3a. Additionally, a right support strut 3b is provided vertically or horizontally in the middle part of the wind exit opening 5b and further a right generator 4b is connected to the right side of axle shaft 2 supported by strut 3b. Here, a single rotation axle 2 is provided between and connected to the left generator 4a and the right generator 4b and the left generator and right generator are operated by the rotation shaft axle 2. A plurality of turbine blades 6a, 6b for converting axially moving wind flowing through the tube 5c to rotation force are provided in axially spaced relationship on the rotation shaft axle 2, and there may be provided a plurality of 2-4 elements on the middle part of the wind passing tube 5c. That is, in summary, the wind entry opening 5a, the left support strut 3a, the left generator 4a and the turbine 6a are provided in sequence from the left side of the main body 1 towards the right side symmetrically in a Bernoulli tube form and further the wind exit opening 5b, the right support strut 3b, the right generator 4b and the turbine 6b are provided on the right side of the main body 1, so that the left elements and the right elements are connected along one rotation shaft axle 2. The turbine 6 provided on the rotation shaft axle 2 may be placed on left and right sides or a middle part of the wind passing tube 5c. However, in consideration of variable wind direction, the turbine blades 6 may be configured left-right symmetrically in order to generate power even in case of reverse wind flow.

Figure 3:
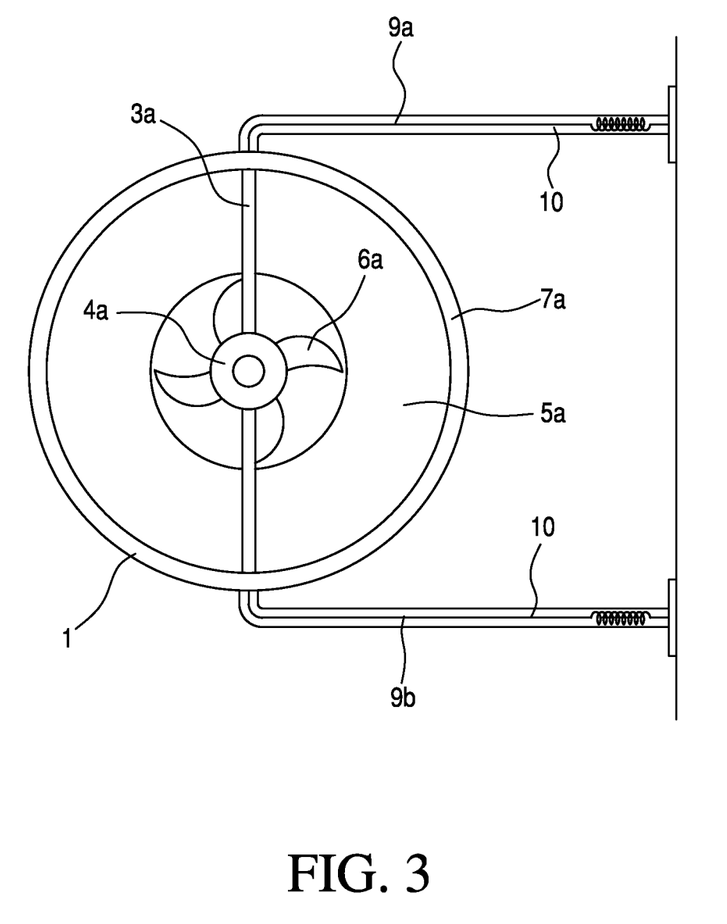
FIG. 3 is a front view of a configuration shown in FIG. 1.
Figure 4:
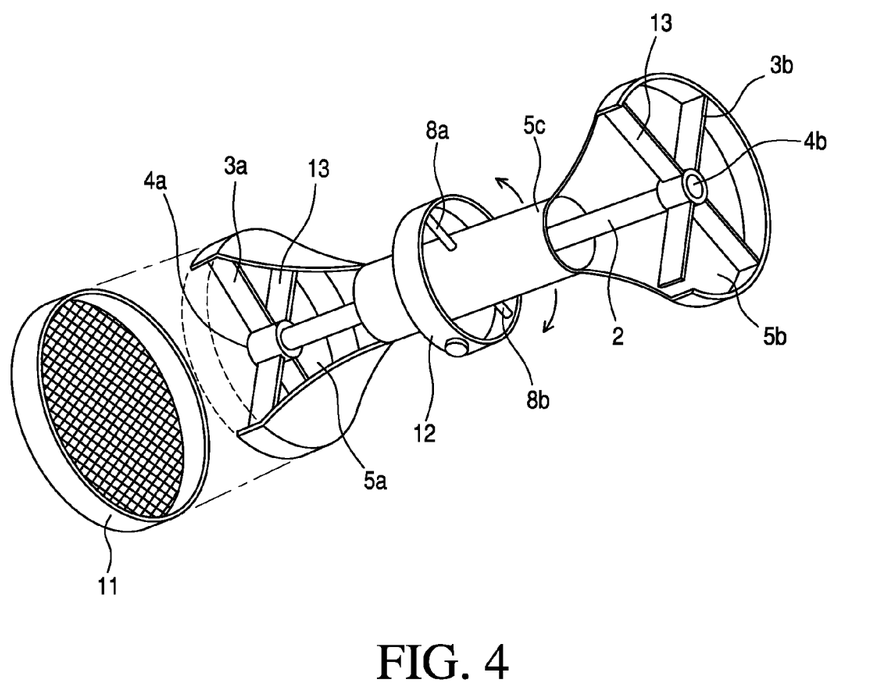
FIG. 4 shows schematically a ring and insect net assembled for the wind power generation system according to an embodiment of the invention.

FIG. 3 shows schematically a front face of the wind power generator according to the present invention, the views of the wind entry opening 5a or the wind exit opening 5b being symmetrical with each other. As shown in FIG. 1 (but not visible in FIG. 3), upper and lower rotation or bearing rings 8a, 8b are provided on the middle part of the main body 1 and further upper and lower support rods 9a, 9b are connected to the upper and lower rotation rings 8a, 8b, respectively. Alternatively, as shown in FIG. 4, a separate support ring 12 is connected to the rotation rings 8a, 8b by support rods and further the support ring 12 on its inner side is connected to the main body 1 in a vertical or horizontal direction by the support rods, with upper and lower support rods 9a, 9b being connected to the outside of the separate ring 12 (not illustrated in FIG. 4) by rotation rings.

Figure 2:
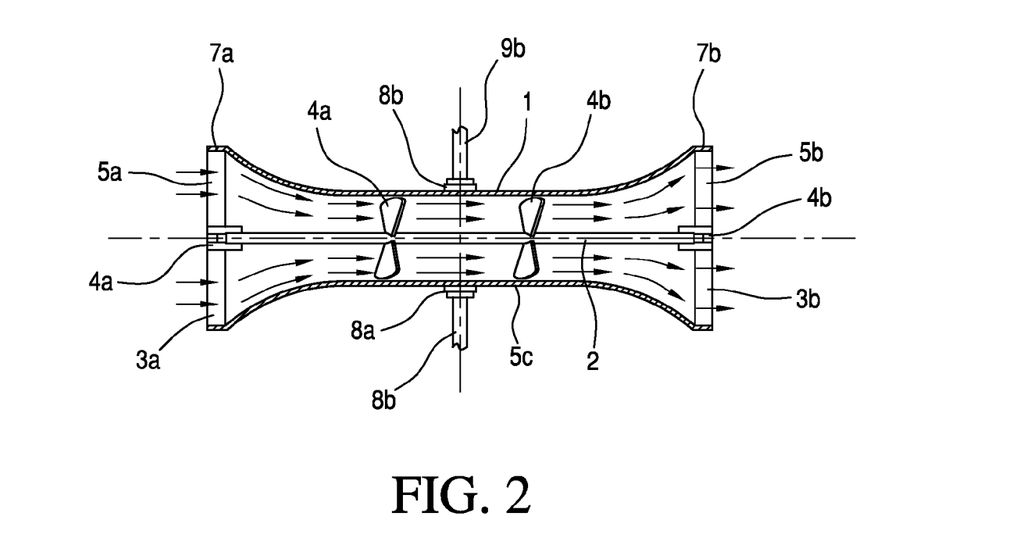
FIG. 2 shows schematically an operation of a wind power generation system according to an embodiment of the invention.

In operation of the wind power generator according to the present invention, as shown in FIG. 2, it is well known that wind entering through the wind entry opening 5a will be accelerated in the wind passing tube 5c which has smaller diameter than the wind entry opening. The accelerated wind causes the left turbine 6a to be rotated and passes through the wind passing tube 5c and then causes the right turbine 6b to be rotated. At this time the rotation axis 2 is rotated through the rotation of the left and right turbines 6a, 6b and thus the left and right generators 4a, 4b are operated to generate electrical power.

According to the present invention, an advantageous effect is obtained that solves drawbacks of the prior art (see FIG. 11), where wind impacting against blades and generator provided in the wind passing tube 5c interrupts or impedes wind flow and sometimes causes reverse-flow, thereby decreasing power generation efficiency. That is, according to one embodiment of the present invention, the left and right generators 4a, 4b are provided on the central part of the wind entry and exit openings 5a, 5b so that wind resistance is decreased and further double turbines are provided on one rotation shaft axle inside the wind passing tube 5c so that power generation efficiency is increased. Accordingly, the left and right generators 4a, 4b are operated doubly efficiently through the turbines 6a, 6b, compared to the prior art wind power system. In particular, even if wind flows in through the wind exit opening 5b, the same power as in case of the wind entry at wind entry opening 5a is generated. That is, even when wind direction is changed at 180 degree, power is generated with the same efficiency.

Meanwhile, a wind direction key or vane 13 is provided on the respective wind entry opening 5a and wind exit opening 5b so that the main body 1 is rotated smoothly in the manner of a weathervane even with a light wind flowing. Here, the wind direction vane 13 may be provided either on outside or on inside of the main body 1, as shown in FIG. 4. When the wind direction vane 13 is provided symmetrically on left and right ends of the main body, power generation efficiency is increased dramatically in case of wind direction being reversed, especially in a city street, or at morning or evening times.

The main body 1 configured left-right symmetrically is connected to the left and right rotation bearing rings 8a, 8b and the upper and lower support rods 9a, 9b, so friction force is decreased doubly at the upper side and lower sides, and thus even in case of light wind the main body may be rotated depending on wind direction, increasing power generation efficiency by 50%.

Figure 5:
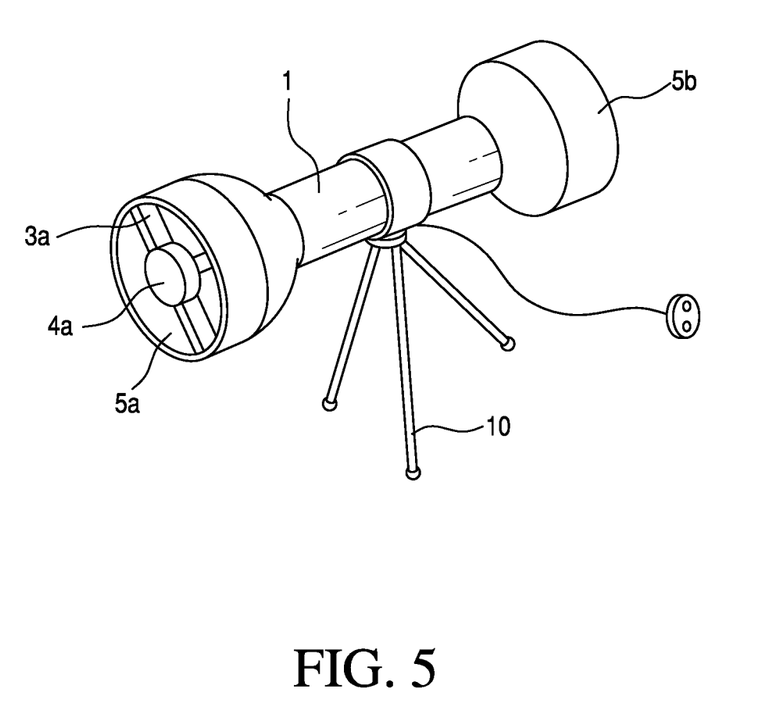
FIG. 5 shows schematically the wind power generation system formed to be portable according to an embodiment of the invention.
Figure 6:
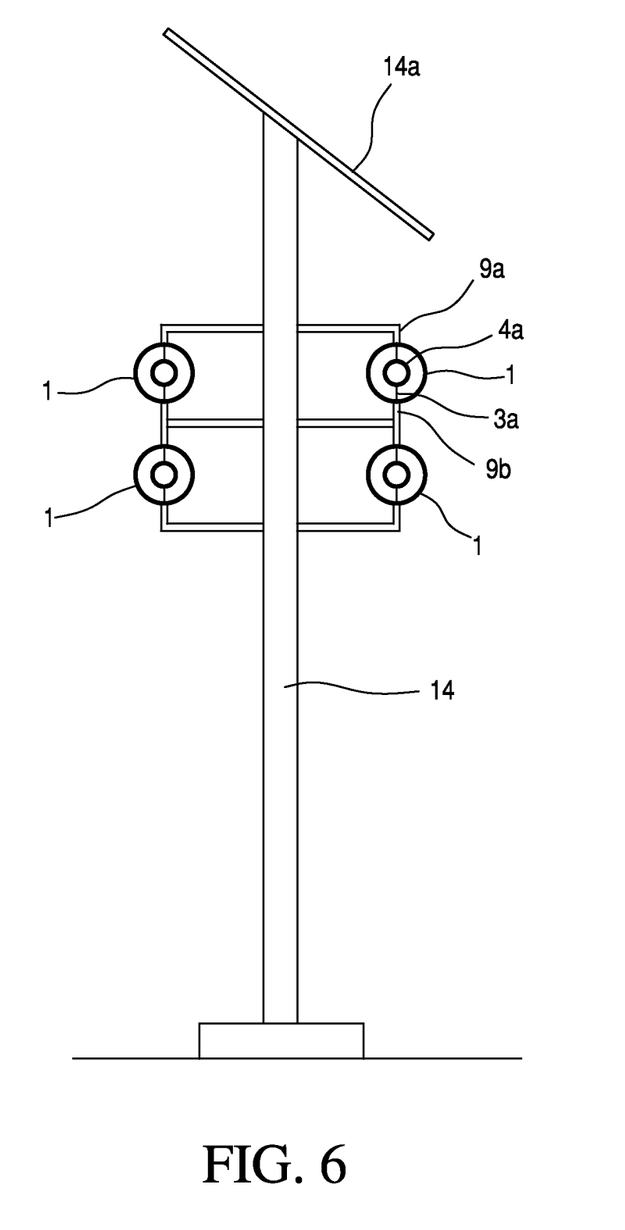
FIG. 6 shows schematically the wind power generation system connected to a base or plate structure according to an embodiment of the invention.
Figure 7:
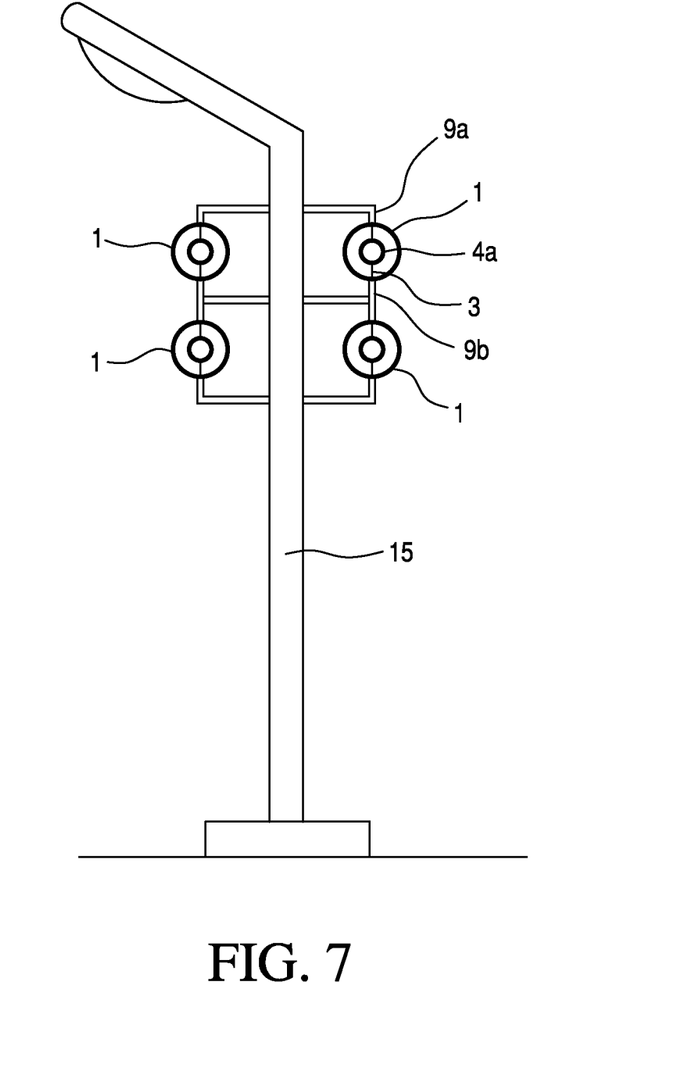
FIG. 7 shows schematically the wind power generation system connected to a street light according to an embodiment of the invention.

Meanwhile, the wind power generation system according to the present invention may be provided with a tripod 10, as shown in FIG. 5, and it may generate power outdoors as a portable power generation system. Furthermore, as shown in FIG. 6, several wind power generation systems according to the present invention may be provided on a lower support rod 14 of a solar power generation system 14a. In addition, as shown in FIG. 7, the wind power generation system according to the present invention may be provided on a street light 15 or a traffic light and further a support rod in the form of a gate (not shown) may be provided on a road and the gate may be provided at a regular intervals on the road depending on wind strength and several wind power generation systems may be arranged in parallel on an upper part of the gate and thus the wind power generation system may be provided on whole country road network.

Figure 8:
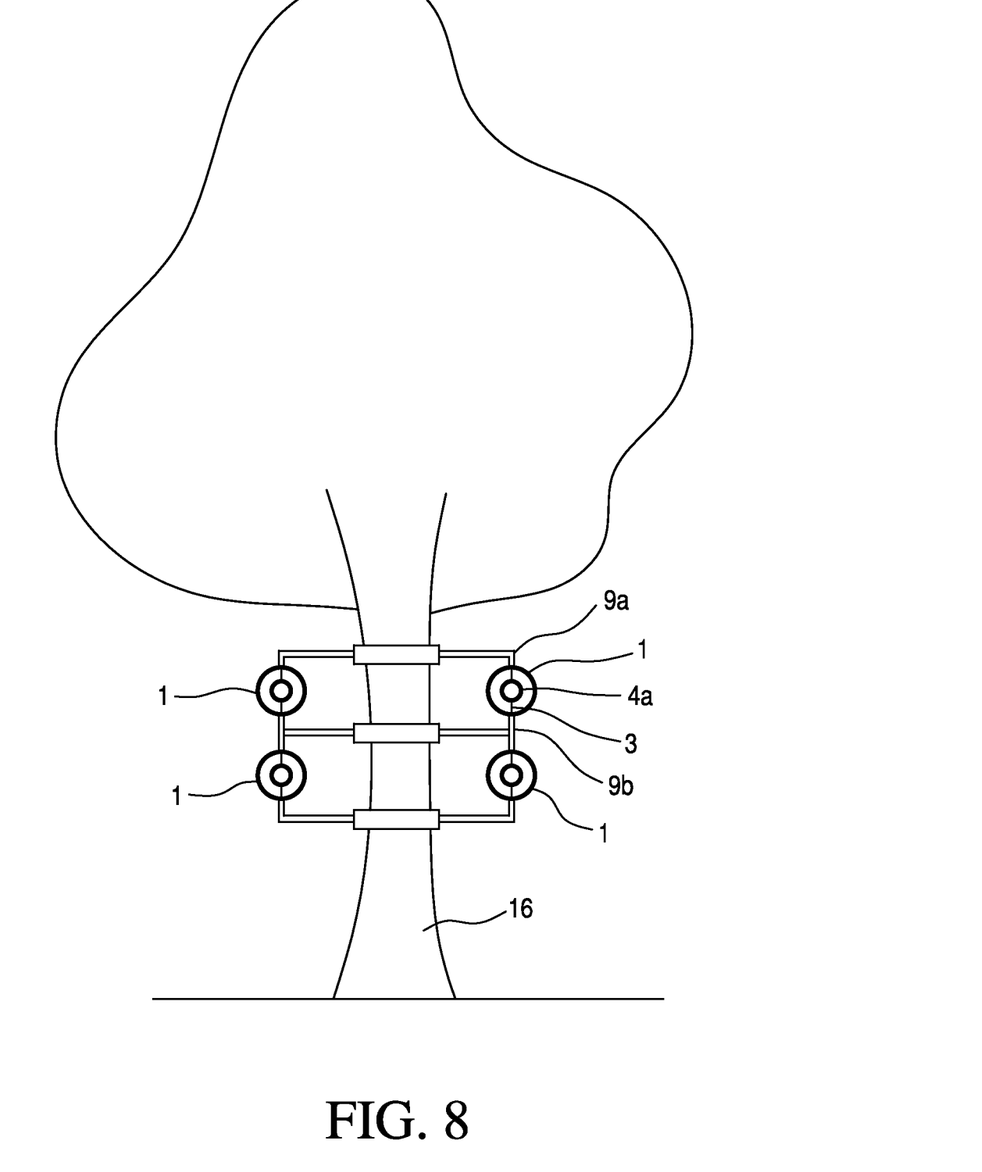
FIG. 8 shows schematically the wind power generation system connected to a tree according to an embodiment of the invention.
Figure 9:
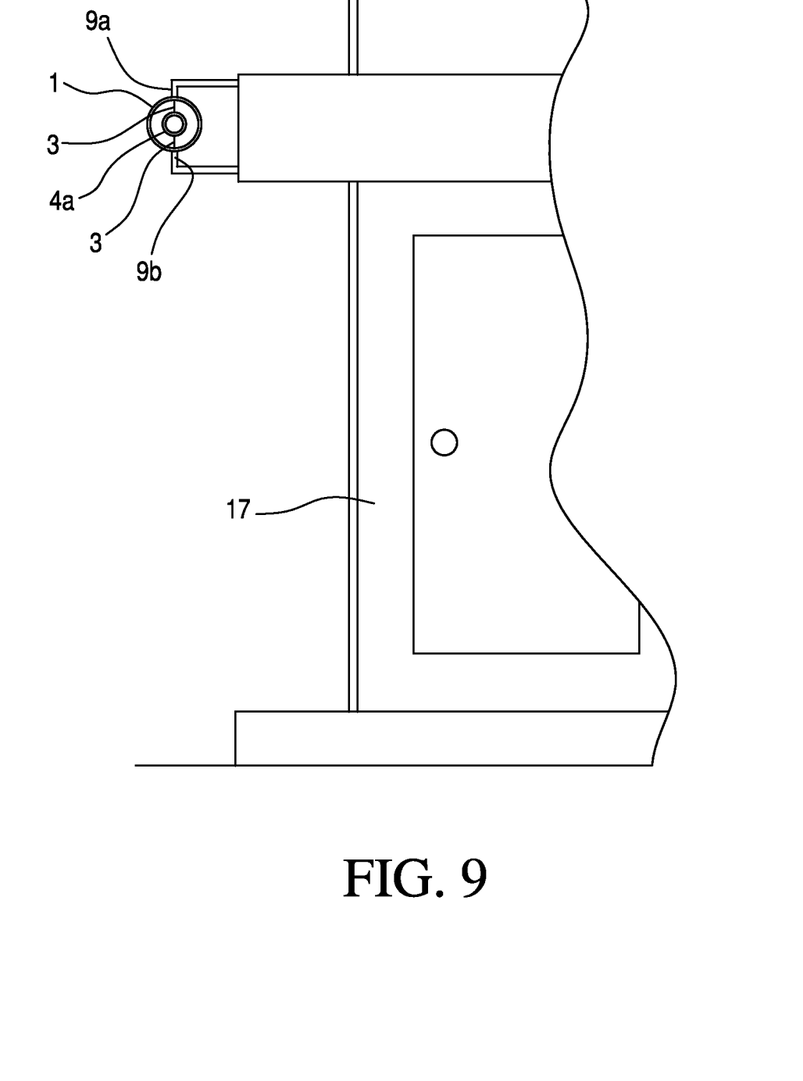
FIG. 9 shows schematically the wind power generation system connected to a wall face or a building according to an embodiment of the invention.

As shown in FIG. 8, the wind power generation system according to the present invention may be provided on a tree 16 in a forest in mountains and further may be provided a wall face 17, as shown in FIG. 9, and the wind power generation system may be provided on a business building, office building, advertisement board, apartment wall face, school building, etc. Accordingly, separate power generation systems for each building can be provided. When the wind power generation system is provided on a support rod or a tree in a forest, or a street light on a road, small insects, leaves, etc. may be ingested into the interior of the system and thus the wind passing tube 5c may be contaminated with such materials. In order to avoid this contamination, as shown in FIG. 4, an insect net screen 11 may be provided on the wind entry and exit openings 5a, 5b and thus contamination inside the wind passing tube 5c and around the turbines such as insects or other impurities, may be avoided when the wind power generation system is located in a forest, downtown or on a street light.

Figure 10:
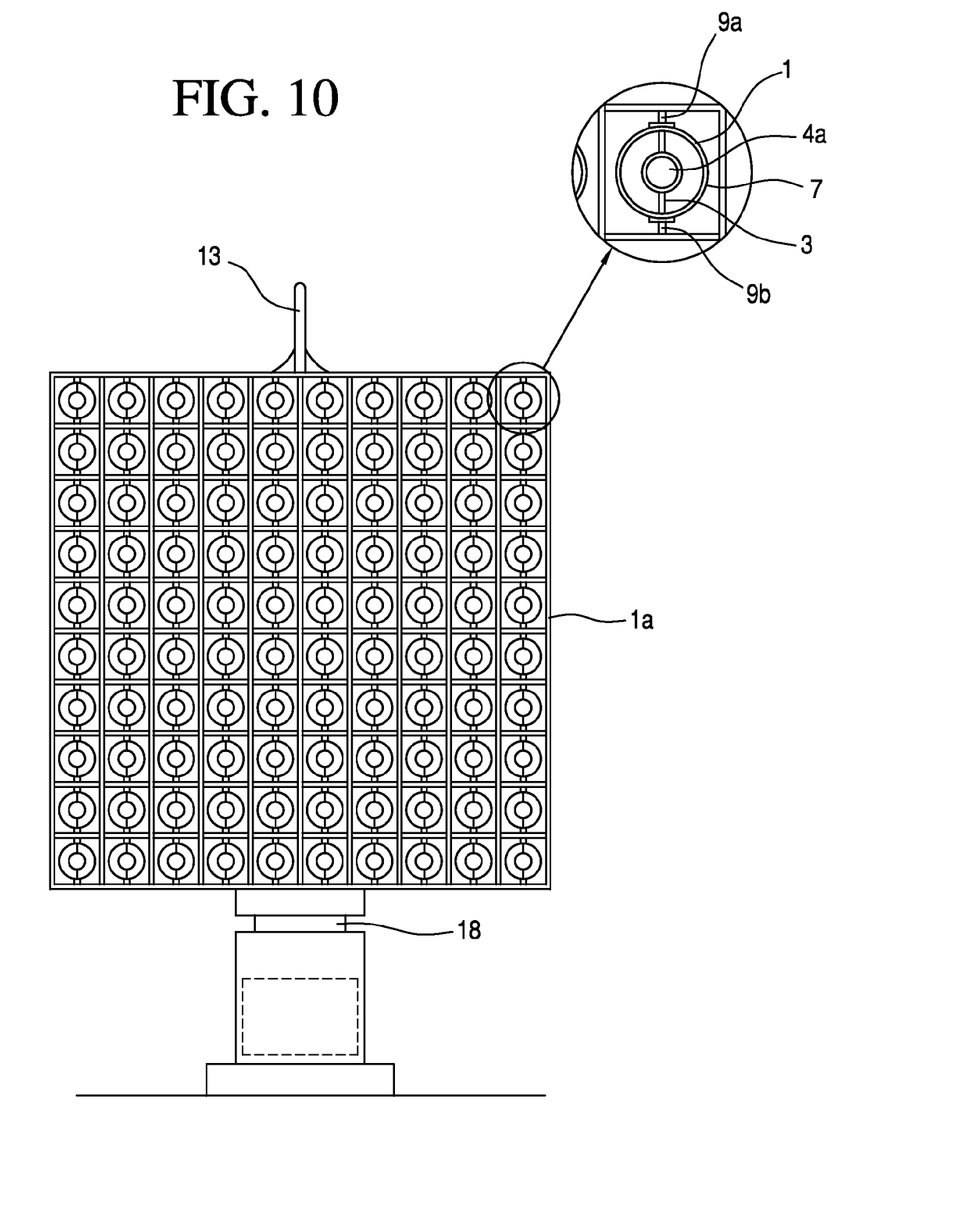
FIG. 10 shows schematically the wind power generation system arranged in plural left-right rows and up-down columns (i.e., a grid) according to an embodiment of the invention.

As shown in FIG. 10, a frame main body 1a may be provided and when 10 units of the wind power generation system each having 40 W output are provided laterally in rows or vertically in columns in the frame main body as a grid, the total power generation becomes 400 W, and further when 10 units of the wind power generation system each having 40 W output are provided laterally and vertically, the total power generation becomes 4 KW. By increasing the number of units provided in the frame main body, a large amount of power generation may be possible. Meanwhile, referring to the aforementioned frame configuration, a wind direction key or vane 13 may be provided on upper part of the frame main body 1a and a rotatable support shaft or bearing 18 may be further provided on a lower part of the frame main body 1a and thus the whole frame main body 1a may be rotated depending by the wind via direction vane 13 around or on the shaft 18, so the main tube bodies 1 may be rotated using upper and lower support rods 9a, 9b, thereby increasing power generation efficiency depending on wind direction.

In particular, the occupation area of the wind power system according to the present invention may be decreased to less than ¼, comparing to that of the prior wind power system where only one power generation system is provided on one support rod.

FIG. 3 shows a front view of the wind power generation system shown in FIG. 1, wherein the same reference numerals indicated in FIG. 3 for showing one wind power generation system are used in FIGS. 5-10 for clarity and convenience.

Through the symmetrical rotation configuration of the wind power generation system according to the present invention, power is generated even in light wind and a smaller structure may be possible and thus a hundreds to thousands of power systems may be provided without limitations on locations.

While embodiments of the invention are described referring to the preferred embodiments, the invention is not limited thereto, and thus various variation and modification can be made without departing from a scope of the invention.

What is claimed is:

1. A wind power generation system comprising a Bernoulli tube having left-right symmetry, said Bernoulli tube comprising:
    an elongated wind tube having opposed symmetric right and left open ends forming an entry and exit opening of the elongated wind tube, each right and left open end having a diameter, and a central section between and connected to the open ends having a central diameter smaller than the diameters of the open ends configured to induce acceleration of wind passing through the central section in accordance with the Bernoulli principle;
    a rotation shaft extending through the tube between the open ends and rotatably secured to the tube at opposed ends thereof adjacent the open ends by support struts;
    at least two power generators, each power generator being arranged on respective centric parts in the right and left open ends of the elongated wind tube in a way such that wind resistance is minimized when wind is passed through the elongated wind tube, said at least two power generators drivingly connected to the shaft axle adjacent the opposed open ends in the entry and exit openings and centrally of the support struts so that the rotation shaft rotates simultaneously with the at least two power generators;
    at least one rotor blade drivingly connected to the rotation shaft and located in axially spaced relationship in the central section in a way such that the at least one rotor blade is arranged to be driven by wind passing through the wind tube to rotate the rotation shaft to generate electric power by simultaneously rotating the at least two power generators,
    wherein the central section of the elongated wind tube is only provided with the rotation shaft with the rotor blade in a way such that wind flow passing inside the elongated wind tube is not interrupted, and
    wherein the at least two power generators are configured to generate electric power simultaneously by the rotation of the rotation shaft and, at the same time, the at least two power generators are configured to generate simultaneously with the same efficiency even when a wind direction from a left and right side is changed in opposite directions.

2. The wind power generation system according to claim 1, including a support system rotatably supporting the wind tube for rotation about a transverse axis of rotation.

3. The wind power generation system according to claim 1, including a netting or screen covering the opposed open ends.

4. A system comprising multiple ones of wind power generation systems according to claim 1, said multiple ones disposed adjacent each other and supported together as a unit.

5. The system according to claim 4, said multiple ones being arranged in a grid pattern of rows and columns.

6. The wind power generation system according to claim 1, wherein each of the left and right open ends are in the shape of a cone having a first end having a first diameter and a second end having a second diameter, wherein the first diameter is larger than the second diameter and the second diameter corresponds to the central diameter of the central section.

7. The wind power generation system according to claim 6, wherein the support struts in the right and left open ends are at least centrally located vertically or horizontally in the first ends of the left and right open ends, respectively.

8. The wind power generation system according to claim 7, wherein each of the two power generators are located centrally in the first ends of the left and right open ends on first and second ends of the rotation shaft so that each of the at least two power generators are operated by the rotation shaft.

* * * * *